United States Patent

Dieterich et al.

Patent Number: 5,779,879
Date of Patent: Jul. 14, 1998

[54] APPARATUS AND METHOD FOR REDUCING HARMFUL SUBSTANCES IN COMBUSTION GASES

[75] Inventors: Klaus Dieterich, Stuttgart; Wolfgang Blankenhorn, Ostfildern, both of Germany

[73] Assignee: Robert Bosch GmbH, Stuttgart, Germany

[21] Appl. No.: 682,593

[22] PCT Filed: Feb. 2, 1995

[86] PCT No.: PCT/DE95/00128

§ 371 Date: Jul. 24, 1996

§ 102(e) Date: Jul. 24, 1996

[87] PCT Pub. No.: WO95/21684

PCT Pub. Date: Aug. 17, 1995

[30] Foreign Application Priority Data

Feb. 15, 1994 [DE] Germany .................. 44 04 681.2

[51] Int. Cl.$^6$ ............................................. B01D 53/32
[52] U.S. Cl. .................. 205/763; 205/765; 204/277; 204/278
[58] Field of Search ..................... 205/763, 765; 204/277, 278

[56] References Cited

U.S. PATENT DOCUMENTS

| | | | |
|---|---|---|---|
| 3,739,553 | 6/1973 | Aine | 60/278 |
| 4,713,152 | 12/1987 | Walsh | 204/130 |
| 5,118,395 | 6/1992 | Chen et al. | 205/165 |

FOREIGN PATENT DOCUMENTS 27 34 677 A1   2/1979   Germany.

Primary Examiner—Arun S. Phasge
Attorney, Agent, or Firm—Spencer & Frank

[57] ABSTRACT

An apparatus and a method for reducing harmful substances, particularly nitrogen oxides, in combustion exhaust gases in a combustion process performed with an oxygen-nitrogen-air mixture (atmosphere). At least one conduit (chamber 48) that conducts the oxygen-nitrogen-air mixture is provided and associated with an exhaust gas conduit (34) that is connected to a combustion chamber, with the conduit being provided with an intermediate wall (44) that separator the chamber is permeable to the oxygen or stores it. Of the oxygen-nitrogen-air mixture, only the oxygen is supplied to a combustion waste gas that is conducted to a combustion chamber.

17 Claims, 2 Drawing Sheets

APPARATUS AND METHOD FOR REDUCING HARMFUL SUBSTANCES IN COMBUSTION GASES

The invention relates to an apparatus and a method for reducing harmful substances in combustion gases, particularly nitrogen oxides, in combustion exhaust gases in a combustion process performed using a supplied oxygen-nitrogen-air mixture (atmosphere).

STATE OF THE ART

It is known that the oxygen in the air is used during combustion processes. For example, in internal combustion engines in motor vehicles, a fuel-air mixture is created that is ignited with the aid of an ignition agent to obtain the drive energy for the motor vehicle with the internal combustion engine. A number of combustion gases are formed from the fuel and air during this combustion process. The combustion gases formed from the fuel are typically separated out to a great extent by means of a catalytic converter, which reduces environmental pollution. The use of air results in the formation of nitrogen oxides during the combustion process due to the nitrogen component in the air. In terms of economics, these oxides are costly to eliminate with a catalytic converter, and therefore represent a significant form of environmental pollution. Moreover, the formation of nitrogen oxide does not allow an optimization of combustion in the lean range of the internal combustion engine.

SUMMARY AND ADVANTAGES OF THE INVENTION

A reduction in the harmful substances, particularly nitrogen oxides, in the combustion exhaust gases performed using a supplied oxygen-nitrogen-air mixture (atmosphere), is achieved according to one aspect of the invention by an apparatus which comprises at least one supply conduit or chamber that conducts the oxygen-nitrogen-air mixture and which is associated with an exhaust gas conduit that is connected to a combustion chamber, an intermediate wall that separates the supply chamber from the exhaust gas conduit and which is selectively permeable to the oxygen ($O_2$) of the oxygen-nitrogen-air mixture to cause oxygen from the oxygen-nitrogen-air mixture to be supplied to the combustion exhaust gas mixture, and a further conduit for conveying the oxygen containing combustion exhaust gas to the combustion chamber as the supply gas for combustion.

In contrast, the apparatus of the invention for reducing harmful substances in combustion gases, as described above, offers the advantage that the atmospheric nitrogen is not supplied to the combustion during combustion processes involving the supply of air, which prevents the formation of nitrogen oxides in the combustion gas. Because at least one conduit that conducts the oxygen-nitrogen-air mixture is associated with an exhaust gas conduit that is connected to a combustion chamber, the conduit being provided with a fresh air connection and an exhaust air connection and having a jacket that is permeable to the oxygen of the oxygen-nitrogen-air mixture, the combustion can advantageously be further performed with the supply of atmospheric oxygen taken from the atmospheric air, while the atmospheric nitrogen present in the atmospheric air does not come into contact with the combustion gases supplied to the combustion chamber.

In an advantageous embodiment of the invention, it is provided that the jacket comprises a material that conducts oxygen ions, and is preferably connected to a voltage source. The oxygen ions of the atmospheric oxygen can pass through the jacket of the conduit that conducts the oxygen-nitrogen-air mixture; however, the jacket represents an insurmountable barrier to the atmospheric nitrogen. With the application of a correspondingly-polarized voltage, the transport of the oxygen ions through the conduit jacket can be advantageously improved so that, if needed, the oxygen concentration can be influenced by a selectable voltage during the combustion process.

The method of the invention for reducing harmful substances offers the advantage that the combustion processes can be performed with the supply of atmospheric oxygen, as is known, and the atmospheric nitrogen that produces harmful substances can be kept out of the combustion process without necessitating complicated and therefore expensive method steps.

In a preferred embodiment of the method, it is provided that the oxygen-nitrogen-air mixture is conducted through an oxygen-storing pipe system, and this pipe system is subsequently rinsed with the combustion gas. In this instance, oxygen can advantageously be stored in the pipe system during the conduction of the oxygen-nitrogen-air mixture, while the atmospheric nitrogen is conducted through the pipe system without bonding at all. During the subsequent rinsing with the combustion gas, the stored oxygen is received by the gas and thus supplied to the combustion process, while the nitrogen is kept away from the process.

Further, advantageous embodiments of the invention ensue from the other features disclosed in the dependent claims.

BRIEF DESCRIPTION OF THE DRAWINGS

The invention is described in detail below by way of embodiments illustrated in the associated drawings. Wherein.

DETAILED DESCRIPTION OF THE PREFERRED EMBODIMENTS

Figure 1:
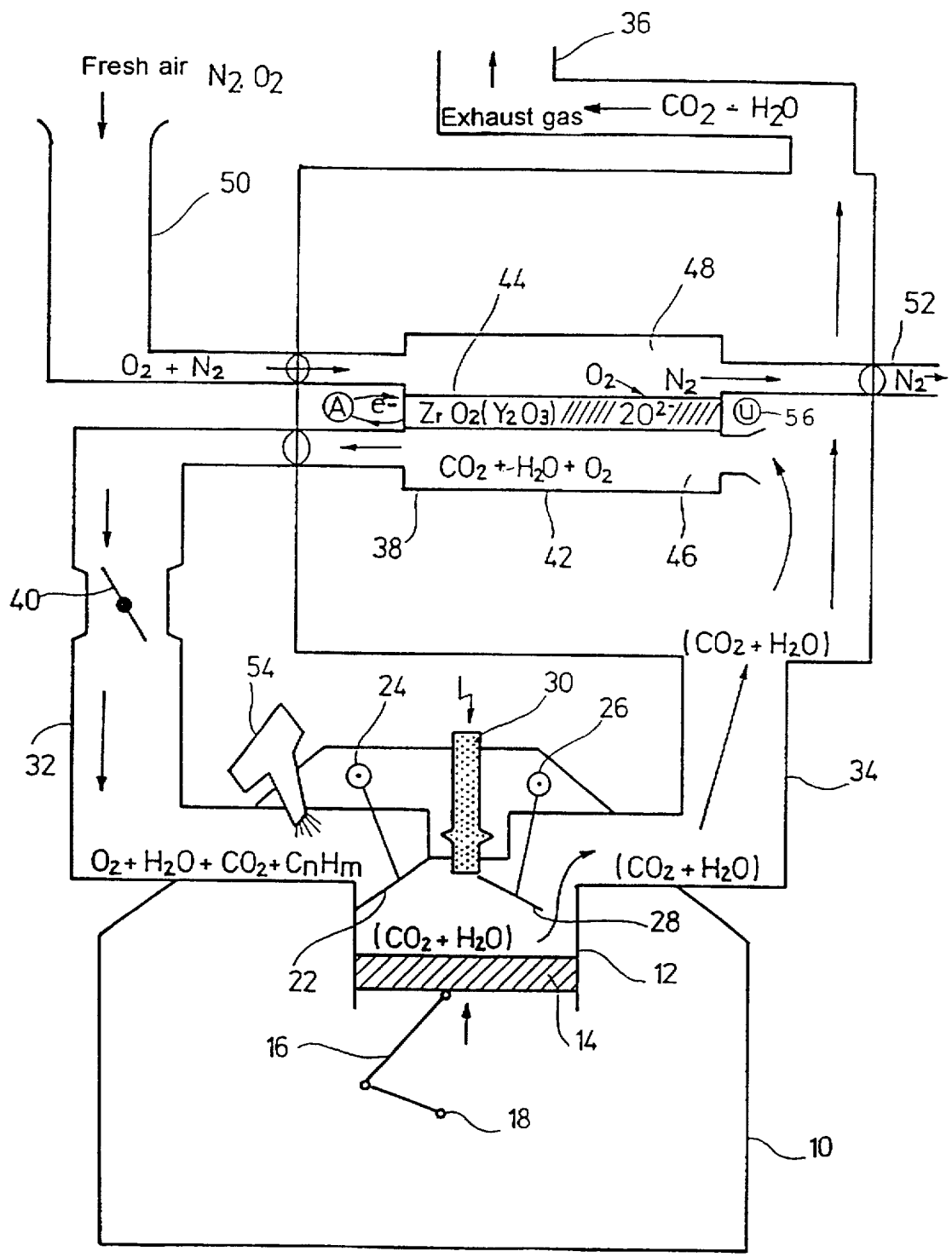
FIG. 1 schematically shows an arrangement of nitrogen-free combustion in an internal combustion engine according to the invention, and FIG. 2 schematically shows an apparatus for separating atmospheric oxygen out of an oxygen-nitrogen-air mixture (atmosphere).

FIG. 1 schematically shows an internal combustion engine 10. The internal combustion engine 10 includes at least one cylinder 12, in which a piston 14 is guided that is connected to a crankshaft 18 by way of a connecting rod 16. The cylinder 12 has an intake valve 22 that can be actuated by way of a first camshaft 24. An exhaust valve 28 can be actuated by way of a second camshaft 26. An ignition source 30, for example, a spark plug, is further associated with the cylinder 12. A suction conduit 32 and an exhaust gas conduit 34 are associated with the internal combustion engine 10. The exhaust gas conduit 34 terminates at one end in an outlet 36 and at the other end in a conduit 38 connected to the suction conduit 32. A throttle valve 40 is disposed inside the suction conduit 32. A fuel-injection valve 54 is further associated with the suction conduit 32. The conduit 38 includes an expansion 42, inside of which an intermediate wall 44 is disposed that divides the expansion 42 into a first chamber 46 and a second chamber 48. The chamber 46 terminates in the suction conduit 32. The chamber 48 is provided with a fresh air connection 50 and an exhaust air connection 52. Neither the fresh air connection 50 nor the exhaust air connection 52 is connected to the exhaust gas conduit 34, and may be guided through it in a sealed manner. The intermediate wall 44 separating the chambers 46 and 48 from one another comprises, for example, zirconium oxide $ZrO_2$ ($Y_2O_3$). The intermediate wall 44 is connected to a voltage source 56 indicated here by U.

The arrangement shown in FIG. 1 performs the following functions:

During operation of the internal combustion engine 10, a fuel-air mixture is compressed inside the cylinder 12 and ignited by the ignition source 30. The injection of the fuel-air mixture and the compression and ignition of the mixture take place in a way that is commonly known, and need not be explained in detail here. An explosion-like combustion occurs due to the ignition of the air-fuel mixture, resulting in an exhaust gas that contains carbon dioxide $CO_2$ and water $H_2O$ as essential components. This exhaust gas is pushed into the exhaust gas conduit 34 when the exhaust valve 28 is open. From here, a portion of the gas travels into the outlet 36 and another portion travels into the chamber 46 of the expansion 42. From there it is supplied again to the cylinder 12 via the suction conduit 32 when the intake valve 22 is open, corresponding to the position of the throttle valve 40. Prior to this, the fuel is added to this exhaust gas via the injection valve 54 in order to produce an explosive mixture. The details of this process are also commonly known, and need not be explained here.

Because the combustion process can only take place in the presence of oxygen $O_2$, atmospheric air (atmosphere) is typically used for the fuel-air mixture. In this case, the atmospheric oxygen present in the atmosphere is utilized for the combustion process. As already mentioned in the description of the prior art, nitrogen oxides that lead to additional pollution of the environment are also formed by the atmospheric nitrogen during the combustion process.

In accordance with the invention, the atmosphere is conducted into the chamber 48 of the expansion 42 by way of the fresh air connection 50. The intermediate wall 44 of the expansion comprises a material that conducts oxygen ions $2O^{2-}$ so that the atmospheric oxygen $O_2$ from the atmosphere can diffuse into the chamber 46 through the intermediate wall 44. With the exhaust air, the oxygen ions diffusing through the intermediate wall 44 form a mixture of exhaust gas and oxygen $O_2$ in the chamber 46. This mixture is supplied to the cylinder 12 following the injection of fuel via the injection valve 54, and can be burnt there. The diffused oxygen ions provide sufficient oxygen for combustion. Because only the atmospheric oxygen is removed from the atmosphere used in the chamber 48, the atmospheric nitrogen $N_2$ remains in the atmosphere and is carried off via the exhaust air connection 52. This prevents atmospheric nitrogen from mixing with the combustion gases that have mixed with the atmospheric oxygen and will be supplied to a new combustion process. The formation of nitrogen oxides $NO_x$ during the combustion process is therefore reliably avoided. Because the entire atmospheric oxygen component does not diffuse into the chamber 46 through the intermediate wall 44, the proportion of oxygen ions $2O^{2-}$ that pass through the intermediate wall 44 can be increased by increasing the density of the intermediate wall 44 by adding a porous metal electrode and applying a correspondingly-polarized voltage by way of the voltage source 56. Since the oxygen ions have a negative potential, the voltage must be polarized such that its acceleration in the direction of the chamber 46 is increased and a corresponding charge carrier exchange takes place, as indicated by A in FIG. 1.

Figure 2:
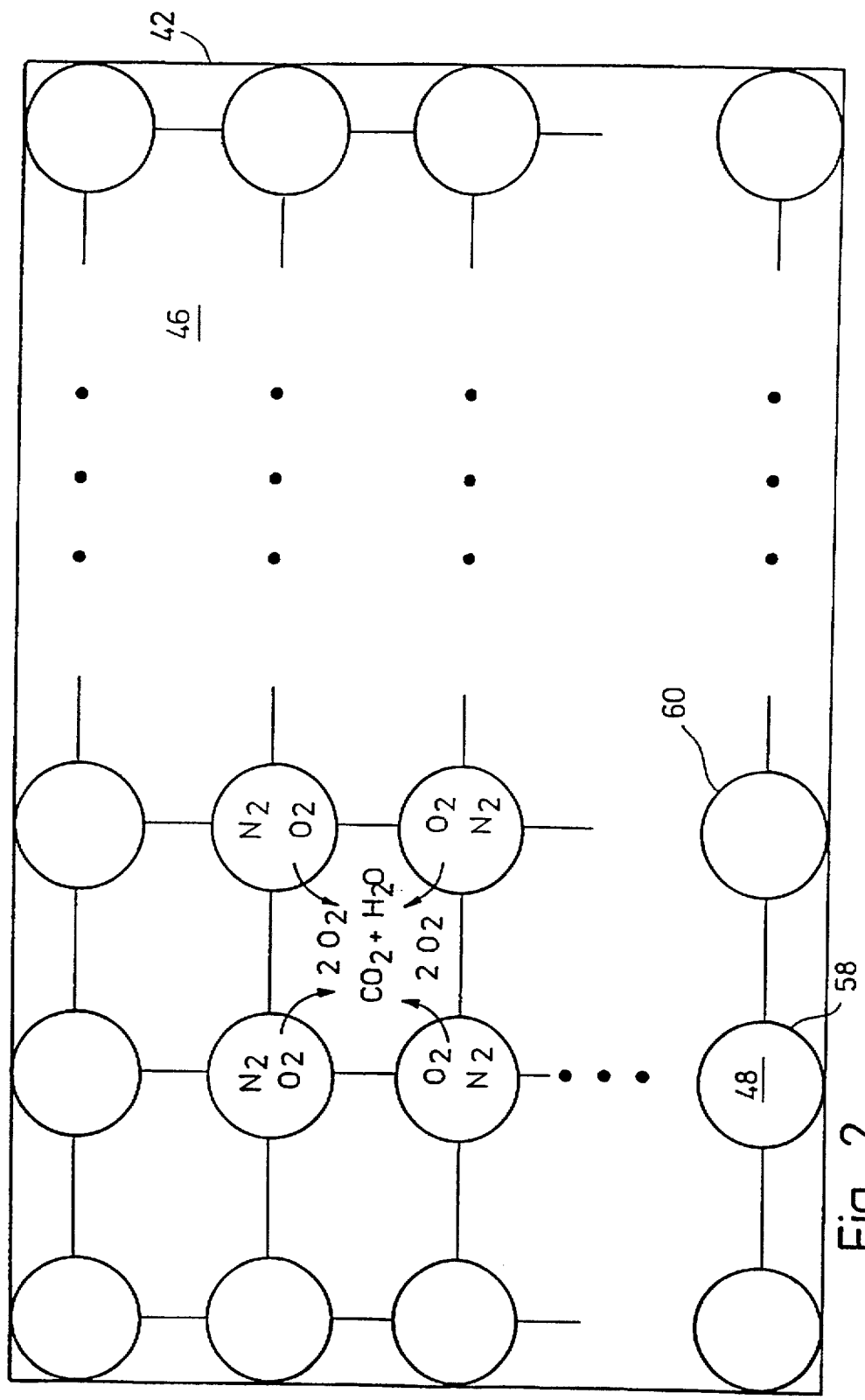

A concrete, possible embodiment of the expansion 42 of FIG. 1 is shown in FIG. 2. The chamber 46 is indicated inside the expansion 42, which is likewise shown as an example, and can have any other shape. A bundle comprising a plurality of individual pipes 58 extends through the chamber 46; these pipes are spaced from one another, and their cross sections form, in their entirety, the chamber 48. As shown in FIG. 2, the pipes 58 are connected at one end to the fresh air connection 50 and at the other end to the exhaust air connection 52. A jacket 60 of the pipes 58 forms the intermediate wall 44.

Fresh air is pumped through the pipe system comprising the pipes 58, whereas the combustion gases coming from the combustion process are re-supplied to the process through the spatial volume between the individual pipes 58, that is, the chamber 46. Because of the difference in oxygen concentrations between the atmospheric air in the interior of the individual pipes 58 (chamber 48) and in the chamber 46, through which the combustion gases flow, oxygen ions pass through the oxygen-ion-conducting material of the jacket 60 and enrich the combustion gases with oxygen. Because the jacket 60 (intermediate wall 44) is impermeable to the atmospheric nitrogen, the atmospheric nitrogen is re-released into the atmosphere by way of the exhaust air connection 52 without being involved in the combustion process. As already mentioned, this prevents the formation of nitrogen oxides $NO_x$ during combustion processes. The individual pipes 58 of the pipe system can also be connected to a correspondingly-polarized voltage source, which further increases the effect of the oxygen transport by means of the oxygen ions. The available diffusion surface for the oxygen ions is increased by the configuration of the chamber 48 and the pipe system of the pipes 58, so a larger quantity of oxygen can be supplied to the exhaust gas.

In accordance with a further embodiment, not shown, a chamber or a system of individual pipes can be provided whose jacket comprises a material that stores oxygen ions, for example, barium oxide BaO. This conduit or pipe system can be connected to either the fresh air connection 50 and the exhaust air connection 52 or the exhaust gas conduit 34 and the suction conduit 32 by way of switchable slide elements. In a first method step, fresh air having a temperature of approximately 550° C. and a pressure of approximately 2 atm is pumped through the conduit or pipe system. The atmospheric oxygen of the fresh air is stored, in the form of barium dioxide $BaO_2$, in the jacket comprising barium oxide.

After the connections have been switched to the conduit or the pipe system, the exhaust gas of the combustion process is rinsed through the conduit or pipe system in a next method step. The gas has a temperature of, for example, approximately 800° C. and a pressure of approximately 1 atm. Barium oxide BaO and gaseous oxygen $O_2$ are formed from the barium dioxide $BaO_2$. The gaseous oxygen $O_2$ mixes with the exhaust gas and can be re-supplied to a combustion process. Because the atmospheric nitrogen of the fresh air is not stored in the barium oxide, and was conducted out of the conduit or pipe system prior to the entrance of the exhaust gas, the atmospheric nitrogen is prevented from being involved in the combustion process, which prevents the formation of nitrogen oxides. Instead of the conduit or pipe system being made entirely of barium oxide, an inside coating of barium oxide or structures, for example lattice structures, of barium oxide can also be provided.

We claim:

1. Apparatus for reducing harmful nitrogen oxides, in combustion exhaust gases in a combustion process performed with an oxygen-nitrogen-air supply mixture (atmosphere), comprising: a supply chamber that conducts the oxygen-nitrogen-air supply mixture and has an inlet and an outlet; at least one exhaust gas chamber which is in communication with an exhaust gas conduit that is connected between a combustion chamber and a further outlet, and which is connected to the supply chamber via an intermediate wall, with the intermediate wall being selectively permeable to the oxygen ($O_2$) of the oxygen-nitrogen-air supply mixture; and a further conduit connecting the exhaust gas chamber with the combustion chamber to supply oxygen enriched exhaust gas formed in the exhaust gas chamber to the combustion chamber.

2. Apparatus according to claim 1, wherein the intermediate wall comprises a material that conducts oxygen ions.

3. Apparatus according to claim 1, wherein the supply chamber is formed by a bundle of individual pipes spaced from one another.

4. Apparatus according to claim 1, wherein the intermediate wall is connected to a voltage source.

5. Apparatus according to claim 4, wherein the density of the intermediate wall is increased by the addition of a porous metal electrode.

6. Apparatus according to claim 1, wherein the exhaust gas conduit and the supply chamber have a common fresh air connection, an exhaust air connection and a suction conduit that can be connected separately to the supply chamber or the exhaust gas conduit, and the supply chamber or the exhaust conduit comprises material that stores oxygen.

7. Apparatus according to claim 6, wherein the oxygen-storing material is barium oxide (BaO).

8. Method of reducing harmful nitrogen oxides, in combustion exhaust gases, comprising conducting an oxygen-nitrogen-air supply mixture (atmosphere) through a conduit, separating the oxygen from the mixture, separately conducting the combustion gases from a combustion chamber to the combustion chamber through the conduit to supply the separated oxygen to the combustion gas, and conducting the oxygen enriched combustion gas to the combustion chamber.

9. Method according to claim 8, wherein the oxygen diffuses through an intermediate wall of a conduit that conducts the oxygen-nitrogen-air mixture to cause the separation.

10. Method according to claim 9, wherein the diffusion is influenced by the application of a correspondingly-polarized voltage.

11. Method according to claim 8, wherein the oxygen-nitrogen-air mixture is conducted through a a pipe system that forms the conduit and stores oxygen, and that the pipe system is subsequently rinsed with the combustion gas to form the enriched combustion gas.

12. Method according to claim 11, wherein the oxygen-nitrogen-air mixture is conducted through the pipe system at a temperature of 500° C. to 600° C., and a pressure of 1.5 atm to 2.5 atm.

13. Method according to claim 12, wherein the oxygen-nitrogen-air mixture is conducted through the pipe system at a temperature of approximately 550° C.

14. Method according to claim 13, wherein the oxygen-nitrogen-air mixture is conducted through the pipe system at a pressure of 2 atm.

15. Method according to claim 12, wherein the oxygen-nitrogen-air mixture is conducted through the pipe system at a pressure of 2 atm.

16. Method according to claim 11, wherein the combustion gases are conducted through the pipe system at a temperature of 750° C. to 850° C. and a pressure of approximately 1 atm.

17. Method according to claim 16, wherein the combustion gases are conducted through the pipe system at a temperature of approximately 800° C.

* * * * *